124,018

UNITED STATES PATENT OFFICE.

HARRIET Z. SILL, OF PITTSBURG, PENNSYLVANIA, ASSIGNOR TO HERSELF AND ATLEE V. COALE, OF SAME PLACE.

IMPROVEMENT IN COSMETIC COMPOUNDS.

Specification forming part of Letters Patent No. 124,018, dated February 27, 1872.

SPECIFICATION.

*To all whom it may concern:*

Be it known that I, HARRIET Z. SILL, of Pittsburg, in the county of Allegheny and State of Pennsylvania, have invented a new and useful Improvement in Cosmetic Compound; and I do hereby declare the following to be a full, clear, and exact description thereof.

In the preparation of cosmetics, heretofore, white lead or other like article, has been commonly employed as the base. This article, it is well known, is exceedingly deleterious in its action on the skin.

The object of my invention is to prepare an equally good or better cosmetic, in which the use of white lead or other like injurious ingredient shall be dispensed with, and for such purpose I substitute what is known to the trade as "terra alba" for white lead, and prepare my improved cosmetic, as hereinafter set forth.

To enable others skilled in the art to make and use my improvement, I will proceed to describe the same.

For materials I take, terra alba, eight ounces, by weight; glycerine, one-fourth drachm, by measure; carmine, one-half grain by weight, and a small but sufficient quantity of bergamot or other essential oil for flavoring purposes, if a flavoring is desired. These I grind together or mix thoroughly, and then add about five ounces, by measure, of water.

The proportions above named may be varied somewhat without departing from the scope of the invention. The cosmetic thus prepared is harmless in its effect on the skin, and equally as efficacious as the preparations heretofore employed for like uses.

What I claim as my invention, and desire to secure by Letters Patent, is—

1. The composition hereinbefore described, and in the proportions indicated, as a cosmetic.

2. "Terra alba" as a substitute for metallic oxides in the preparation of cosmetic compounds.

In testimony whereof I, the said HARRIET Z. SILL, have hereunto set my hand.

HARRIET Z. SILL.

Witnesses:
J. P. FLEMING,
A. MILLAR.